United States Patent [19]

Cheron

[11] 4,015,052
[45] Mar. 29, 1977

[54] FUEL CELL

[75] Inventor: Jacques Cheron, Maisons-Lafitte, France

[73] Assignee: Institut Francais du Petrole, des Carburants et Lubrifiants et Entreprise de Recherches et d'Activities Petrolieres Elf, France

[22] Filed: Sept. 30, 1975

[21] Appl. No.: 617,993

[30] Foreign Application Priority Data

Sept. 10, 1974 France .............................. 74.34193

[52] U.S. Cl. .................................................. 429/14
[51] Int. Cl.² .......................................... H01M 8/04
[58] Field of Search ............ 136/86 R, 86 E, 86 B, 136/86 C; 429/14

[56] References Cited

UNITED STATES PATENTS

| 3,457,114 | 7/1969 | Wedin | 136/86 R |
| 3,525,643 | 8/1970 | Spahrbier et al. | 136/86 E |
| 3,861,958 | 1/1975 | Cheron | 136/86 R |

*Primary Examiner*—John H. Mack
*Assistant Examiner*—H. A. Feeley
*Attorney, Agent, or Firm*—Craig & Antonelli

[57] ABSTRACT

This fuel cell comprises circuits for collecting electrolyte leaks in the fuel and comburent chambers, said circuits being connected to the inlet orifice of the electrolyte pump.

The electrolyte tank is located above the electrolyte pump and adjustment means provide for a pressure drop in the electrolyte flow between the tank and the pump inlet.

5 Claims, 3 Drawing Figures

FUEL CELL

The present invention relates to an improved fuel cell.

Generally speaking, the invention concerns a particular arrangement of the elements constituting a fuel cell. Through this arrangement the number of auxiliary elements or fittings of the fuel cell can be reduced and a decrease in the weight and overall dimension of the fuel cell is achieved.

More particularly, the invention provides a fuel cell in which electrolyte leaks can be more easily collected and recycled, this being directly achieved through the fittings equiping the electrolyte feeding circuit of the fuel cell.

The invention will be more readily understood and the advantages thereof made apparent from the following description, illustrated by the accompanying drawings wherein:

FIG. 1 diagrammatically illustrates a prior art fuel cell,

Throughout the drawings the same reference numerals have been used to designate the same elements.

Figure 1:
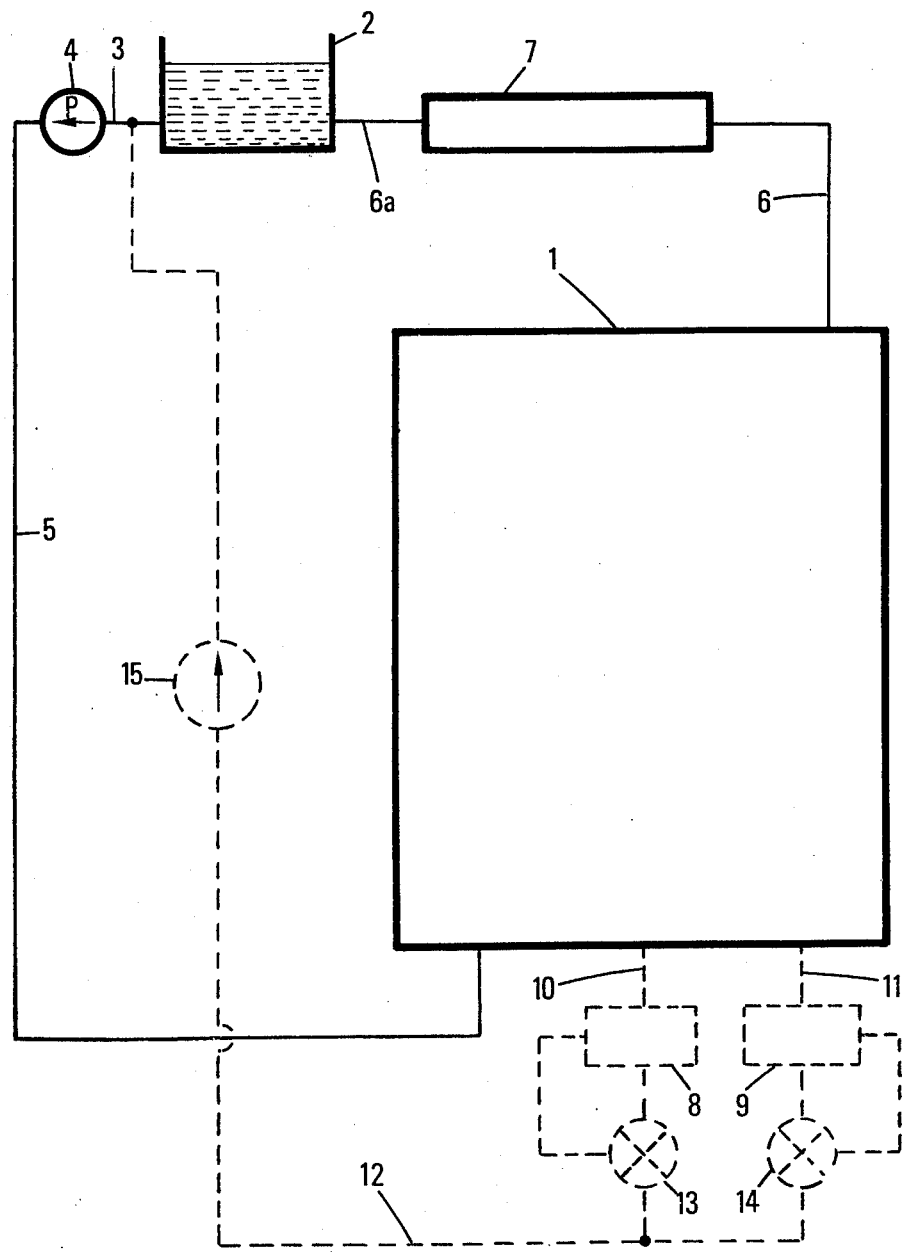

In FIG. 1, which diagrammatically illustrates a prior art fuel cell, reference numeral 1 designates a fuel cell block wherein, for example, electrodes delimit first chambers containing fuel, second chambers fed with a comburent and third chambers supplied with electrolyte.

The circuits feeding the fuel cell block 1 with fuel and comburent are not shown in the drawing.

The fuel feeding circuit of block 1 is shown in solid lines. It comprises an electrolyte tank 2, whose outlet orifice is connected to the inlet orifice of a pump 4, through a pipe 3. A pipe 5 connects the outlet orifice of pump 4 to the inlet orifice of the fuel cell block 1. The outlet orifice of the fuel cell block 1 is connected through pipe 6 – 6a to the inlet orifice of the electrolyte tank 3 through a heat exchanger 7.

The pump 4 provides for the electrolyte circulation through this feeding circuit.

After having traversed the fuel cell block, the electrolyte is cooled in the heat exchanger, the latter being so designed as to generate in the circuit a pressure drop which is as low as possible.

Usually when the electrolyte flows through the fuel cell block, a slight amount of electrolyte enters the fuel and comburent chambers, thereby decreasing the electrical output of the fuel cell.

To obviate this drawback, collecting and recycling circuits are generally provided for the electrolyte leaks, as illustrated in dashed line in FIG. 1. These circuits, which may be of any known type may, for example, comprise a tank 8 for collecting the electrolyte which has entered the fuel chambers, and a tank 9 for collecting the electrolyte infiltrated into the comburent chambers.

Tank 8 is connected through pipe 10 to those spaces between the electrodes with are fed with fuel, while a pipe 11 connects tank 9 to the chambers of the fuel cell block 1 fed with comburent. These two tanks are connected to the electrolyte feeding circuit of the fuel cell through a recycle pipe 12.

In combination with each collecting tank there is used an obturation device for pipe 12, to prevent that any of the fuel or comburent fraction enter the electrolyte circuit.

These obturation devices may, for example, but not exclusively, comprise valves actuated by floats placed in the collecting tanks or, as illustrated in FIG. 1, may consist of electrically actuated valves 13 and 14, whose closing and opening are controlled by a signal which may be generated by the displacements of the float modifying the magnetic characteristics of circuits associated thereto.

Conventional devices (not shown) may be used for collecting, after condensation, water vapor formed in the fuel cell block 1, such devices being preferably connected upstream the electrically actuated valves 13 and 14.

Generally speaking, these obturation devices are adapted to put the collecting tanks 8 and 9 into communication with the recycling pipe 12 when the electrolyte level in these collecting tanks attains a predetermined maximum height and they discontinue this communication when this electrolyte level has decreased down to a predetermined minimum height.

The so collected electrolyte can be recycled to the feeding circuit of the fuel cell through an auxiliary pump 15. To this end, the auxiliary pump 15 increases the pressure of the collected electrolyte to a value above the atmospheric pressure which prevails in the collecting tanks 8 and 9 and in tank 2.

It is also known in the art to substitute for the auxiliary pump 15 a device, such as a vacuum pump, creating a sufficient vacuum in tank 2, to cause the electrolyte to flow from pipe 12 to tank 2, as a result of the pressure difference between the collecting tanks 8 and 9 and tank 2 respectively.

Figure 2:
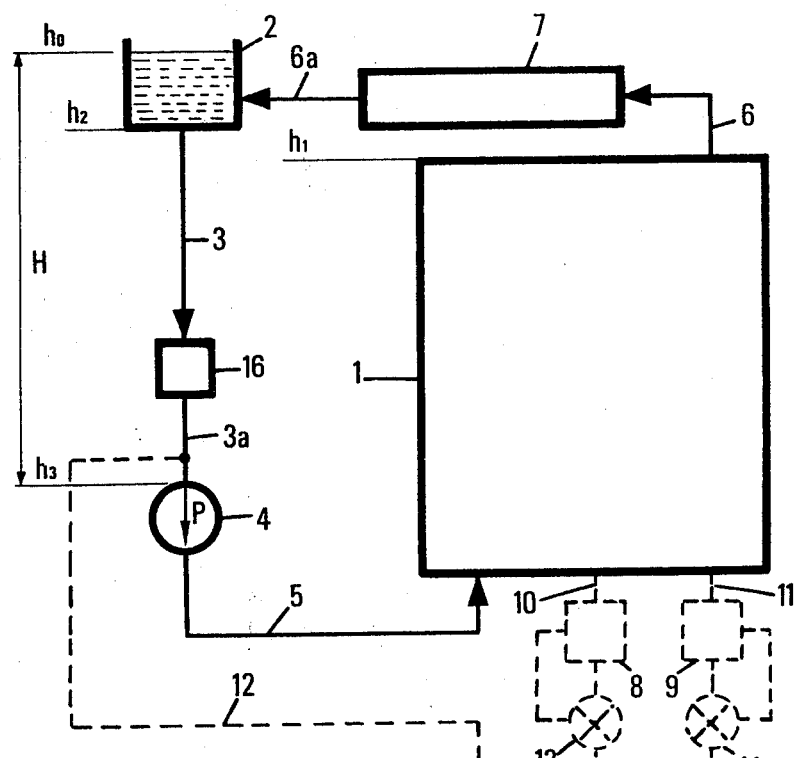
FIG. 2 illustrates a first embodiment of the invention.

According to the present invention this auxiliary device can be omitted by arranging the elements of the feeding circuit of the fuel cell as shown in FIG. 2.

Tank 2 is so located that the electrolyte level $h_o$ in this tank is at least equal to and preferably higher than the level $h_1$ of the electrolyte discharge orifice of the fuel cell block, the electrolyte being under atmospheric pressure in this tank. Pump 4 is placed below tank 2, so that the outlet orifice of tank 2 is at a level $h_2$ above the level $h_3$ of the inlet orifice of pump 4. Furthermore, a device 16, is placed in pipe 3–3a which connects the outlet orifice of tank 2 with the inlet orifice of pump 4, this device 16 providing in the electrolyte flow a dynamic pressure drop at least equal to the value of the hydrostatic pressure of the electrolyte, corresponding to the level difference $H = h_3 + h_o$; said value being smaller than the delivery or discharge pressure of pump 4, this delivery pressure being defined as the difference between the pressures at the outlet and inlet orifices of the pump respectively.

It has been ascertained that, under these conditions, the electrolyte pressure at the pump inlet is lower than the atmospheric one, i.e. smaller than the electrolyte pressure in the collecting tanks.

By connecting the recycling pipe 12 to the pump inlet 4, as shown in FIG. 2, the electrolyte leaks are automatically reintroduced into the feeding circuit of the fuel cell block, without requiring the use of any auxiliary rotating device.

Figure 3:
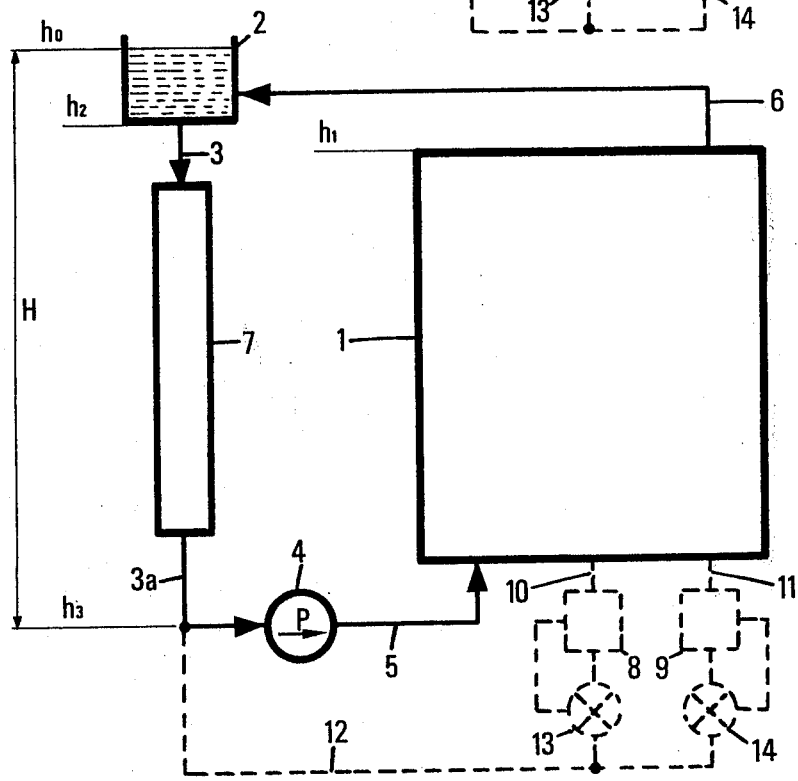
FIG. 3 illustrates a preferred embodiment of the invention.

According to the preferred embodiment of the invention, illustrated by FIG. 3, the device generating a pressure drop between tank 2 and pump 4 is constituted by the heat exchanger 7 which is so designed as to provide a dynamic pressure drop as hereinabove defined.

In practice the height H will be close to the height of the fuel cell block 1.

I claim:

1. In a fuel cell system including:

a fuel cell block defining at least one fuel cell, said fuel cell block being provided with a first group of chambers for receiving electroltye, a second group of chambers for receiving fuel and a third group of chambers for receiving comburent, each group of chambers having respective inlet and outlet orifices for receiving and discharging the fluids passing therethrough;

an electrolyte feeding circuit defining an electrolyte recirculation flow path, said feeding circuit including an electrolyte tank, pump means for pumping electrolyte around said flow path and conduit means connecting said first group of chambers, said electrolyte tank and said pump means so that electrolyte flowing through said flow path passes in order through said first group of chambers, through said tank, through said pump means and then back to said first group of chambers;

collecting means for collecting electrolyte leaking into said second group of chambers and said third group of chambers; and return means for returning electrolyte collected in said collecting means to said electrolyte recirculation flow path;

the improvement wherein:

1. said electrolyte tank and said fuel cell block are so arranged that the inlet orifice of said tank is above the outlet orifice of said first group of chambers;
2. said electrolyte tank and said pump means are arranged so that the outlet orifice of said tank is above the inlet orifice of said pump means;
3. said fuel cell system further includes pressure drop means interposed between said tank and said pump means producing when said pump means is pumping electrolyte through said flow path a dynamic pressure drop, the value of said dynamic pressure drop being between (a) the static pressure of the electrolyte measured between the inlet of said pump means and the electrolyte liquid level in said electrolyte tank and (b) the pressure difference between the pressure at the inlet of said pump means and the outlet of said pump means; and
4. said return means returns electrolyte from said collecting means to said flow path at a location intermedite said pressure drop means and said pump means.

2. The fuel cell system of claim 1, wherein said electrolyte tank is open to the atmosphere.

3. The fuel cell system of claim 2, wherein said dynamic pressure drop means is a heat exchanger for cooling the electrolyte.

4. The fuel cell system of claim 1, wherein said dynamic pressure drop means is a heat exchanger for cooling the electrolyte.

5. In a fuel cell system including:

a fuel cell block defining at least one fuel cell, said fuel cell block being provided with a first group of chambers for receiving electrolyte, a second group of chambers for receiving fuel and a third group of chambers for receiving comburent, each group of chambers haivng respective inlet and outlet orifices for receiving and discharging the fluids passing therethrough;

an electrolyte feeding circuit defining an electrolyte recirculation flow path, said feeding circuit including an electrolyte tank, pump means for pumping electrolyte around said flow path and conduit means connecting said first group of chambers, said electrolyte tank and said pump means so that electrolyte flowing through said flow path passes in order through said first group of chambers, through said tank, through said pump means and then back to said first group of chambers;

collecting means for collecting electrolyte leaking into said second group of chambers and said third group of chambers; and return means for returning electrolyte collected in said collecting means to said electrolyte recirculation flow path;

the improvemet wherein:

1. the inlet orifice of said electrolyte tank is above the outlet orifice of said first group of chambers;
2. the outlet orifice of said electrolyte tank is above the inlet orifice of said pump means;
3. said fuel cell system further includes dynamic pressure drop means interposed between said tank and said pump means producing when said pump means is pumping electrolyte through said flow path a dynamic pressure drop; and
4. said return means returns electrolyte from said collecting means to said flow path at a location intermedite said pressure drop means and said pump means;

the value of said dynamic pressure drop created by said pressure drop means being sufficient so that the pressure of electrolyte at said pump inlet is less than the pressure of the electrolyte at said collecting means whereby electrolyte is automatically returned from said collecting means to said electrolyte flow path.

* * * * *

UNITED STATES PATENT AND TRADEMARK OFFICE
CERTIFICATE OF CORRECTION

PATENT NO. : 4,015,052
DATED : March 29, 1977
INVENTOR(S) : Jacques Cheron

It is certified that error appears in the above-identified patent and that said Letters Patent are hereby corrected as shown below:

Title page, (73) Assignee, which now reads:

"(73) Assignee: Institut Francais du Petrole, des Carburants et Lubrifiants et Entreprise de Recherches et d'Activities Petrolieres Elf, France"

should read:

-- (73) Assignee: Institut Francais du Petrole, France --

Signed and Sealed this

Nineteenth Day of June 1979

[SEAL]

Attest:

RUTH C. MASON
Attesting Officer

DONALD W. BANNER
Commissioner of Patents and Trademarks